US011398171B2

(12) United States Patent
Haberman et al.

(10) Patent No.: US 11,398,171 B2
(45) Date of Patent: *Jul. 26, 2022

(54) SYSTEM FOR AUTHORING AND EDITING PERSONALIZED MESSAGE CAMPAIGNS

(71) Applicant: FreeWheel Media, Inc., Philadelphia, PA (US)

(72) Inventors: Seth Haberman, New York, NY (US); Gerrit Niemeijer, Maplewood, NJ (US); Abel van der Burgh, New York, NY (US); Steven Lubowsky, Hillsdale, NJ (US)

(73) Assignee: FreeWheel Media, Inc., Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/148,912

(22) Filed: Oct. 1, 2018

(65) Prior Publication Data

US 2019/0206290 A1    Jul. 4, 2019

Related U.S. Application Data

(63) Continuation of application No. 10/657,335, filed on Sep. 8, 2003, now Pat. No. 10,134,313.

(Continued)

(51) Int. Cl.
*G09F 27/00* (2006.01)
*G06Q 30/02* (2012.01)
*H04N 7/16* (2011.01)

(52) U.S. Cl.
CPC ............. *G09F 27/00* (2013.01); *G06Q 30/02* (2013.01); *G06Q 30/0251* (2013.01); *H04N 7/163* (2013.01)

(58) Field of Classification Search
CPC .... G09F 27/00; H04N 7/163; G06Q 30/0251; G06Q 30/02
See application file for complete search history.

(56) References Cited

U.S. PATENT DOCUMENTS 3,366,731 A    1/1968   Wallerstein
3,639,686 A    2/1972   Walker et al.
(Continued)

FOREIGN PATENT DOCUMENTS

EP    1217565 A2    6/2002
WO    99/30493 A1    6/1999
(Continued)

OTHER PUBLICATIONS

EPO Communication, EPO Form 2008 (1 page), Summons to attend oral proceedings and EPO Form 2906, mailed from the EPO dated Oct. 5, 2011 (9 pages).

(Continued)

*Primary Examiner* — Kunal Langhnoja
(74) *Attorney, Agent, or Firm* — BakerHostetler

(57) ABSTRACT

A method and system for authoring templates for personalized video message campaigns in general, and personalized TV commercial campaigns in particular. The invention allows for campaign templates to be authored and edited in such a way that commercials can be automatically generated later on in the process, when the target audience and context are known, while at the same time adhering to the existing (post) production workflows and tools. The invention maintains assembly information for messages in a format that allows easy assembly of variations of commercials at any point in the creation, editing, post-production and delivery process.

26 Claims, 11 Drawing Sheets

Related U.S. Application Data

(60) Provisional application No. 60/408,593, filed on Sep. 6, 2002.

(56) References Cited

U.S. PATENT DOCUMENTS

| | | |
|---|---|---|
| 4,331,974 A | 5/1982 | Cogswell et al. |
| 4,475,123 A | 10/1984 | Dumbauld et al. |
| 4,573,072 A | 2/1986 | Freeman |
| 4,602,279 A | 7/1986 | Freeman |
| 4,625,235 A | 11/1986 | Watson |
| 4,638,359 A | 1/1987 | Watson |
| 4,703,423 A | 10/1987 | Bado et al. |
| 4,716,410 A | 12/1987 | Nozaki |
| 4,789,235 A | 12/1988 | Borah et al. |
| 4,814,883 A | 3/1989 | Perine et al. |
| 4,847,698 A | 7/1989 | Freeman |
| 4,847,699 A | 7/1989 | Freeman |
| 4,847,700 A | 7/1989 | Freeman |
| 4,850,007 A | 7/1989 | Marino et al. |
| 4,918,516 A | 4/1990 | Freeman |
| 5,099,422 A | 3/1992 | Foresman et al. |
| 5,105,184 A | 4/1992 | Pirani et al. |
| 5,155,591 A | 10/1992 | Wachob |
| 5,173,900 A | 12/1992 | Miller et al. |
| 5,220,501 A | 6/1993 | Lawlor et al. |
| 5,231,494 A | 7/1993 | Wachob |
| RE34,340 E | 8/1993 | Freeman |
| 5,253,940 A | 10/1993 | Abecassis |
| 5,260,778 A | 11/1993 | Kauffman et al. |
| 5,291,395 A | 3/1994 | Abecassis |
| 5,305,195 A | 4/1994 | Murphy |
| 5,343,239 A | 8/1994 | Lappington et al. |
| 5,347,632 A | 9/1994 | Filepp et al. |
| 5,356,151 A | 10/1994 | Abecassis |
| 5,361,393 A | 11/1994 | Rossillo |
| 5,377,354 A | 12/1994 | Scannell et al. |
| 5,414,455 A | 5/1995 | Hooper et al. |
| 5,422,468 A | 6/1995 | Abecassis |
| 5,424,770 A | 6/1995 | Schmelzer et al. |
| 5,426,281 A | 6/1995 | Abecassis |
| 5,434,678 A | 7/1995 | Abecassis |
| 5,442,390 A | 8/1995 | Hooper et al. |
| 5,442,771 A | 8/1995 | Filepp et al. |
| 5,446,919 A | 8/1995 | Wilkins |
| 5,448,568 A | 9/1995 | Delpuch et al. |
| 5,499,046 A | 3/1996 | Schiller et al. |
| 5,515,098 A | 5/1996 | Carles |
| 5,515,270 A | 5/1996 | Weinblatt |
| 5,519,433 A | 5/1996 | Lappington et al. |
| 5,526,035 A | 6/1996 | Lappington et al. |
| 5,537,141 A | 7/1996 | Harper et al. |
| 5,548,532 A | 8/1996 | Menand et al. |
| 5,550,735 A | 8/1996 | Slade et al. |
| 5,566,353 A | 10/1996 | Cho et al. |
| 5,584,025 A | 12/1996 | Keithley et al. |
| 5,585,838 A | 12/1996 | Lawler et al. |
| 5,585,858 A | 12/1996 | Harper et al. |
| 5,594,910 A | 1/1997 | Filepp et al. |
| 5,610,653 A | 3/1997 | Abecassis |
| 5,617,142 A | 4/1997 | Hamilton |
| 5,632,007 A | 5/1997 | Freeman |
| 5,634,849 A | 6/1997 | Abecassis |
| 5,636,346 A | 6/1997 | Saxe |
| 5,638,113 A | 6/1997 | Lappington et al. |
| 5,652,615 A | 7/1997 | Bryant et al. |
| 5,671,225 A | 9/1997 | Hooper et al. |
| 5,682,196 A | 10/1997 | Freeman |
| 5,684,918 A | 11/1997 | Abecassis |
| 5,696,869 A | 12/1997 | Abecassis |
| 5,717,814 A | 2/1998 | Abecassis |
| 5,717,923 A | 2/1998 | Dedrick |
| 5,724,091 A | 3/1998 | Freeman et al. |
| 5,724,472 A | 3/1998 | Abecassis |
| 5,724,521 A | 3/1998 | Dedrick |
| 5,734,413 A | 3/1998 | Lappington et al. |
| 5,740,388 A | 4/1998 | Hunt |
| 5,740,549 A | 4/1998 | Reilly et al. |
| 5,754,939 A | 5/1998 | Herz et al. |
| 5,758,259 A | 5/1998 | Lawler |
| 5,761,601 A | 6/1998 | Nemirofsky et al. |
| 5,764,275 A | 6/1998 | Lappington et al. |
| 5,768,521 A | 6/1998 | Dedrick |
| 5,774,170 A | 6/1998 | Hite et al. |
| 5,774,664 A | 6/1998 | Hidary et al. |
| 5,778,181 A | 7/1998 | Hidary et al. |
| 5,784,095 A | 7/1998 | Robbins et al. |
| 5,784,528 A | 7/1998 | Yamane et al. |
| 5,796,945 A | 8/1998 | Tarabella |
| 5,802,314 A | 9/1998 | Tullis et al. |
| 5,805,974 A | 9/1998 | Hite et al. |
| 5,825,884 A | 10/1998 | Zdepski et al. |
| 5,835,087 A | 11/1998 | Herz et al. |
| 5,861,881 A | 1/1999 | Freeman et al. |
| 5,867,208 A | 2/1999 | McLaren |
| 5,873,068 A | 2/1999 | Beaumont et al. |
| 5,887,243 A | 3/1999 | Harvey et al. |
| 5,903,263 A | 5/1999 | Emura |
| 5,907,837 A | 5/1999 | Ferrel et al. |
| 5,913,031 A | 6/1999 | Blanchard |
| 5,917,830 A | 6/1999 | Chen et al. |
| 5,929,850 A | 7/1999 | Broadwin et al. |
| 5,931,901 A | 8/1999 | Wolfe et al. |
| 5,937,331 A | 8/1999 | Kalluri et al. |
| 5,978,799 A | 11/1999 | Hirsch |
| 5,986,692 A | 11/1999 | Logan et al. |
| 5,991,735 A | 11/1999 | Gerace |
| 6,002,393 A | 12/1999 | Hite et al. |
| 6,018,768 A | 1/2000 | Ullman et al. |
| 6,026,368 A | 2/2000 | Brown et al. |
| 6,029,045 A | 2/2000 | Picco et al. |
| 6,038,000 A | 3/2000 | Hurst, Jr. |
| 6,038,367 A | 3/2000 | Abecassis |
| 6,049,569 A | 4/2000 | Radha et al. |
| 6,067,348 A | 5/2000 | Hibbeler |
| 6,075,551 A | 6/2000 | Berezowski et al. |
| 6,108,486 A | 8/2000 | Sawabe et al. |
| 6,137,834 A | 10/2000 | Wine et al. |
| 6,141,358 A | 10/2000 | Hurst et al. |
| 6,160,570 A | 12/2000 | Sitnik |
| 6,304,852 B1 | 10/2001 | Loncteaux |
| 6,327,574 B1 | 12/2001 | Kramer et al. |
| 6,330,286 B1 | 12/2001 | Lyons et al. |
| 6,343,287 B1 | 1/2002 | Kumar et al. |
| 6,357,042 B2 | 3/2002 | Srinivasan et al. |
| 6,360,234 B2 | 3/2002 | Jain et al. |
| 6,408,278 B1 | 6/2002 | Carney et al. |
| 6,411,992 B1 | 6/2002 | Srinivasan et al. |
| 6,424,991 B1 | 7/2002 | Gish |
| 6,449,657 B2 | 9/2002 | Stanbach et al. |
| 6,457,010 B1 | 9/2002 | Eldering et al. |
| 6,463,444 B1 | 10/2002 | Jain et al. |
| 6,463,585 B1 | 10/2002 | Hendricks et al. |
| 6,466,975 B1 | 10/2002 | Sterling |
| 6,502,076 B1 | 12/2002 | Smith |
| 6,567,980 B1 | 5/2003 | Jain et al. |
| 6,574,793 B1 | 6/2003 | Ngo et al. |
| 6,588,013 B1 | 7/2003 | Lumley et al. |
| 6,601,237 B1 | 7/2003 | Ten et al. |
| 6,611,624 B1 | 8/2003 | Zhang et al. |
| RE38,376 E | 12/2003 | Matthews, III |
| 6,671,880 B2 | 12/2003 | Shah-Nazaroff et al. |
| 6,678,332 B1 | 1/2004 | Gardere et al. |
| 6,681,395 B1 | 1/2004 | Nishi |
| 6,694,482 B1 | 2/2004 | Arellano et al. |
| 6,698,020 B1 | 2/2004 | Zigmond et al. |
| 6,735,628 B2 | 5/2004 | Eyal |
| 6,785,289 B1 | 8/2004 | Ward et al. |
| 6,806,909 B1 | 10/2004 | Radha et al. |
| 6,850,252 B1 | 2/2005 | Hoffberg |
| 6,857,024 B1 | 2/2005 | Chen et al. |
| 6,877,134 B1 | 4/2005 | Fuller et al. |
| 6,990,246 B1 * | 1/2006 | Ferguson ............ H04N 19/172 375/E7.037 |
| 7,146,627 B1 | 12/2006 | Ismail et al. |

(56) References Cited

U.S. PATENT DOCUMENTS

| | | |
|---|---|---|
| 7,334,249 B1 | 2/2008 | Byers |
| 7,904,922 B1 | 3/2011 | Haberman et al. |
| 8,006,261 B1 | 8/2011 | Haberman et al. |
| 2001/0013124 A1 | 8/2001 | Klosterman et al. |
| 2002/0013943 A1* | 1/2002 | Haberman ............ G11B 27/031 725/39 |
| 2002/0026359 A1 | 2/2002 | Long et al. |
| 2002/0056093 A1 | 5/2002 | Kunkel et al. |
| 2002/0057336 A1 | 5/2002 | Gaul et al. |
| 2002/0083443 A1 | 6/2002 | Eldering et al. |
| 2002/0092017 A1 | 7/2002 | Klosterman et al. |
| 2002/0095676 A1 | 7/2002 | Knee et al. |
| 2002/0122154 A1* | 9/2002 | Morley ............ H04N 21/4532 352/38 |
| 2003/0067554 A1 | 4/2003 | Klarfeld et al. |
| 2003/0110500 A1 | 6/2003 | Rodriguez |
| 2003/0145323 A1 | 7/2003 | Hendricks et al. |
| 2003/0149976 A1 | 8/2003 | Shah-Nazaroff et al. |
| 2003/0171990 A1 | 9/2003 | Rao et al. |
| 2003/0177490 A1 | 9/2003 | Hoshino et al. |
| 2003/0177503 A1 | 9/2003 | Sull et al. |
| 2003/0188311 A1 | 10/2003 | Yuen et al. |
| 2003/0221191 A1 | 11/2003 | Khusheim |
| 2004/0025180 A1 | 2/2004 | Begeja et al. |
| 2004/0111742 A1 | 6/2004 | Hendricks et al. |
| 2004/0136698 A1 | 7/2004 | Mock |
| 2004/0237102 A1 | 11/2004 | Konig et al. |
| 2005/0086691 A1 | 4/2005 | Dudkiewicz et al. |
| 2005/0086692 A1 | 4/2005 | Dudkiewicz et al. |
| 2005/0166224 A1 | 7/2005 | Ficco |

FOREIGN PATENT DOCUMENTS

| | | |
|---|---|---|
| WO | 01/77939 A1 | 10/2001 |
| WO | 2001/077776 | 10/2001 |
| WO | 02/28102 A1 | 4/2002 |

OTHER PUBLICATIONS

Supplemental European Seach Report issued for European Patent Application No. 03752152.3.

* cited by examiner

|              | Shot 2C |         |        |
|--------------|---------|---------|--------|
|              | Shot 2B | Shot 3B |        |
| Shot 1 | Shot 2A | Shot 3A | Shot 4 |

FIG. 7

*Slot*

| Shot 6 | Shot 7 | Shot 8 | Shot 9 |
|--------|--------|--------|--------|
| Shot 1 | Shot 2 | Shot 3 | Shot 4 | Shot 5 |

FIG. 8

SYSTEM FOR AUTHORING AND EDITING PERSONALIZED MESSAGE CAMPAIGNS

RELATED APPLICATION

This application is a continuation of U.S. patent application Ser. No. 10/657,335 filed Sep. 8, 2003, which claims the benefit of U.S. Provisional Application No. 60/408,593 filed on Sep. 6, 2002, which are incorporated herein by reference.

FIELD OF THE INVENTION

This invention is directed towards authoring, editing, and production systems for media and more particularly towards tools for creating personalized TV commercial campaigns.

BACKGROUND

The creation of media campaigns such as television commercials has become more complex as technology allows greater control and variation of creation and delivery of such campaigns. In the case of video messages, there are specific challenges with building templates for personalized message campaigns. Today's processes and products for video message production are focused on the creation of single, linear video messages, and do not easily allow for the creation of sets of inter-related personalized video messages. May things are difficult, including the ability to build templates for personalized message campaigns, in such a way that it is easy to replace certain media elements based on user information, whilst maintaining the narrative of all individual messages. Another difficulty is the ability to build user profile templates, and link the user profile data to the various different media elements in a personalized message campaign template. Another difficulty is the ability to define environmental information, and link that to certain media elements in a personalized message campaign template.

As an example, the present-day process for creating (single) TV commercials is illustrated in FIG. 1. A typical TV commercial starts from a campaign brief 20, which is typically created at the ad agency. The brief is a document that describes goal, target segment, and outline of the commercial. The brief can be hand-written, or created with the help of a productivity tool like a word processor or other.

From there, the creative team designs a linear storyboard 22, which after being approved by the advertiser, becomes the shooting board and script. The storyboard can contain sketches of the final media, or electronic representations (thumbnails). The storyboard can be hand-written, or created with the help of a productivity tool like a word processor or visualization program or other.

The shooting board is used by the production team during the shoot (Acquisition 24). Changes to the script and/or storyboard are changed on location after approval by the agency. The shooting board can be hand written, or created and maintained through a productivity tool like a word processor or visualization program or other. Sometimes (portable versions of) professional editing programs are used on location, so as to be able to create "rough edits" of the commercial (to ensure that the material is good). An example would be the FinalCutPro (Editing Program by Apple Inc.) running on a portable Mac computer.

The resulting media elements are then finally edited 26 and locked down. Audio elements are then recorded and graphics are created. Several professional audio and video (editing) tools are typically used during this phase. Examples are: MediaComposer (Editing Program by Avid), ProTools (Audio Editing Program by DigiDesign), etc.

All media elements are combined into a final linear story during the finishing stage 28. Several professional audio and video (finishing) products are typically used during this phase. An example is Symphony (Finishing Program, Avid). The last two phases (Editing 26 and Finishing) 28 are together referred to as Post-Production. The resulting linear commercial is then either stored on a file server or mastered to videotape.

Most present-day TV commercials are created this way, yet there are numerous possible variations on this basic workflow, such as:

Multiple storyboards (or even complete commercials) are created in parallel, the advertiser will then finally select one of them for final airing.

Iteration in the process, in other words certain steps are repeated one or more times, until the result is approved by the advertiser.

The storyboarding process actually includes the production of a basic low-cost version of the commercial (or at least an animation) so as to make the approval process easier.

Whatever variant on this process is followed, and whatever electronic tools are used to support this, the process is fundamentally designed to produce linear stories where the narrative starts with a particular shot, then moves to the next single shot, and so on until the story is told. Further, although current video editing and finishing applications allow for multiple video, audio and graphics tracks to be active during the creation process, at the time of finishing, all of these tracks are resolved down to a final linear set, as shown in FIG. 2. There is usually one video track 30, with graphics superimposed, and two or four audio tracks 32.

When this process is used to create different versions of a commercial, the finishing process actually results in a set of separate linear TV commercials that are not related to each other anymore (although 80% of the content of the commercial may be identical). If it becomes necessary to make changes in the "common" part of the TV commercials, it is necessary to go back to the production process and re-do all different variants of the commercial. More specifically, the process does not allow for elements of the commercial to be automatically changed/customized later on in the process (the commercial is already finished, and cannot be changed anymore without going back to the production and finishing process). This makes it impossible to automatically generate personalized versions of the commercial that are specific for a given audience or context at (or close to) the time of play out.

Simply put, one of the limitations of the present day process is that after post-production, all relations between media (different versions) and data (demographics) are lost. All that is left is a (set of) linear TV commercial(s). This makes it impossible to automatically change the commercial and make it more relevant to a target audience later on in the process.

SUMMARY

The present invention includes a method for authoring personalized video messages more easily. An illustrative embodiment of the present invention is described in terms of a set of tools. The present invention includes a method for creating a message campaign, the message campaign allowing the creation of a plurality of different messages to targeted audiences. A specific targeted audience receives a selected one of the plurality of different messages based upon criteria of the specific targeted audience. The method includes providing a plurality of media segments, the media segments for assembly into the plurality of different messages to targeted audiences, wherein at least one of the media segments is interchangeable with another one of the media segments. The media segments may be created, preexisting or created at a later time. The method also includes providing assembly information regarding how the plurality of media segments may be assembled to create the different messages. The assembly information is then associated with the plurality of media segments. This assembly information and media segments may then be packaged up to be broadcast or dispersed.

Further, a message for a specific targeted audience may be assembled at a later time, the message being assembled based upon the assembly information, the plurality of media segments, and on information regarding the target audience. An example is selecting media segments based on a target audience's age or preferences, and using that media segment along with other related or unrelated media segments to assemble the message. Further, one or more media segments used to assemble the messages may be created at the later time. An example is titling for a message or commercial may be created and assembled with the message right before it is shown to a target audience.

The assembly information may include rules for use at the later time, the rules for use in determining which of the plurality of the media segments to use in assembling a message for the specific targeted audience, based on the information regarding the target audience. The rules can include "default conditions" for determining which of the plurality of the media segments to use when no appropriate information regarding the target audience is available. A subset of the plurality of media segments can form a default generic message.

Media segments can include audio, video, voice overs, and background music. Each type of segment can be assembled with other segments based on information or conditions imposed by the assembly information. The assembly information can include data representing time segments; the media segments, and conditions. This assembly information forms a network which maintains a matrix-like overview of the media segments, their timing, and how they may be combined with other media segments in order to assemble the messages. In one illustrative embodiment, the message for a specific targeted audience is assembled in a set top box for a television receiver contemporaneously with displaying the message to the specific targeted audience.

The specification includes illustrative embodiments focusing on a television commercial as a specific form of personalized video message, yet it is easy to see that the approach is equally valid for personalized video messages in general (e.g. personalized news casts) and even personalized messages in general (e.g. personalized audio message, personalized multi-media presentation).

An illustrative embodiment defines the concept of a matrix to represent sets of video messages in general, and a personalized commercial campaign template in particular. The matrix defines TV messages in terms of defaults and options for video, audio, narration, titling overlay, and other media elements. The matrix associates segmentation data with the various media options. Once the matrix is created, produced, and finished, it can be played out at different delivery networks, to different target audiences, in different contexts, in which case it will each time generate a specific TV commercial that is customized to audience and context. A possible implementation of a method for authoring personalized messages using the matrix concept specifically focuses on a data model (network) that represents the matrix-based message template. The data model typically is object oriented, and can be stored in relational database or other to form a data repository that is shared among tools. The tools will use the data in the repository, and interface with the workflows and tools that are currently being used during production of TV messages.

One advantage of the illustrative embodiment over existing (post) production tools and products, is that it allows for campaign templates to be authored in such a way that the commercial can be automatically generated later on in the process, when the target audience and context are known, while at the same time adhering to the existing (post) production workflows and tools.

Another advantage is that it is possible to produce and finish sets of (related) TV commercials more efficiently. For instance, if a set of related TV commercials (in a matrix-based system) share a piece of media (e.g. the opening scene), and that piece of media needs to be re-worked (e.g. re-edited), then the tools and system as described in this document will allow for this to be done by one single edit session, after which the update will effectively "ripple" its way through the matrix of related commercials (whereas in the current process, one would have to individually re-work all individual messages). This brings an efficiency advantage to (post) production of related TV commercials.

Yet another advantage over the current process for producing TV commercials lies in the moment of media assembly. In the current process, TV commercials are singular after production, in other words: the final choice of media is made during the production and finishing process. In fact the post-production can only be finalized if all media choices are made. The concept of a narration matrix according to one embodiment of the present invention allows sets of related commercials to be post-produced, effectively delaying the moment of final media choice and assembly until after the post-production process (to a point where the audience and context are better known).

BRIEF DESCRIPTION OF THE DRAWINGS

The foregoing and other features and advantages of the present invention will be more fully understood from the following detailed description of illustrative embodiments, taken in conjunction with the accompanying drawings in which:

FIG. 7 shows an example matrix with restrictions;

FIG. 8 shows an example of fully disjunct commercials in a matrix;

DETAILED DESCRIPTION

U.S. patent application Ser. No. 09/545,524 entitled TEMPLATE CREATION AND EDITING FOR A MESSAGE CAMPAIGN and assigned to Visible World Inc., describes a novel system for creating personalized messages for audiences and is incorporated herein by reference.

The present invention introduces a new, efficient way of authoring personalized TV commercial campaign templates, based on the concept of Matrix-Based Narrative. Matrix-Based Narrative provides the ability for commercial campaign templates to be authored in two dimensions (time and choice), and the resulting finished commercial campaign template will still include these two dimensions (as opposed to the current approach, where a finished commercial only has the time dimension, since there is no element of choice anymore). More specifically a Matrix-Based Narrative contains a linear (default) commercial, but for one or more elements (called "slots") of this commercial it contains multiple play-out candidates (called "options").

Figure 3:
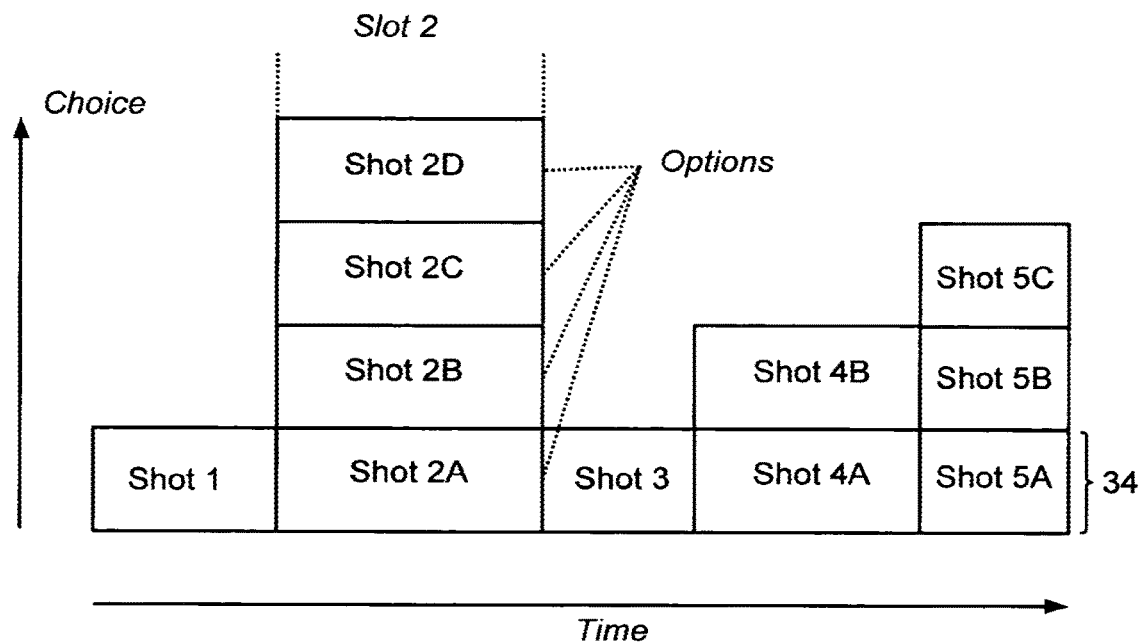
FIG. 3 shows a video matrix according to the present invention.

A simple example of such a matrix according to the present invention is shown in FIG. 3. For the sake of simplicity, this example only considers the video-part of the commercial (ignoring audio- and other elements for now). The example illustrates a simple commercial, consisting of five shots, where shot 2, 4, and 5 are actually slots with multiple options. It is easy to see that the video-matrix defines a default commercial 32 (composed of Shot 1, Shot 2A, Shot 3, Shot 4A, Shot SA) as well as twenty-three alternative commercials (generated by sequencing the various permutations of options for each slot). Total number of commercials contained within the video-matrix is twenty-four (=1×4×1×2×3).

Figure 4:
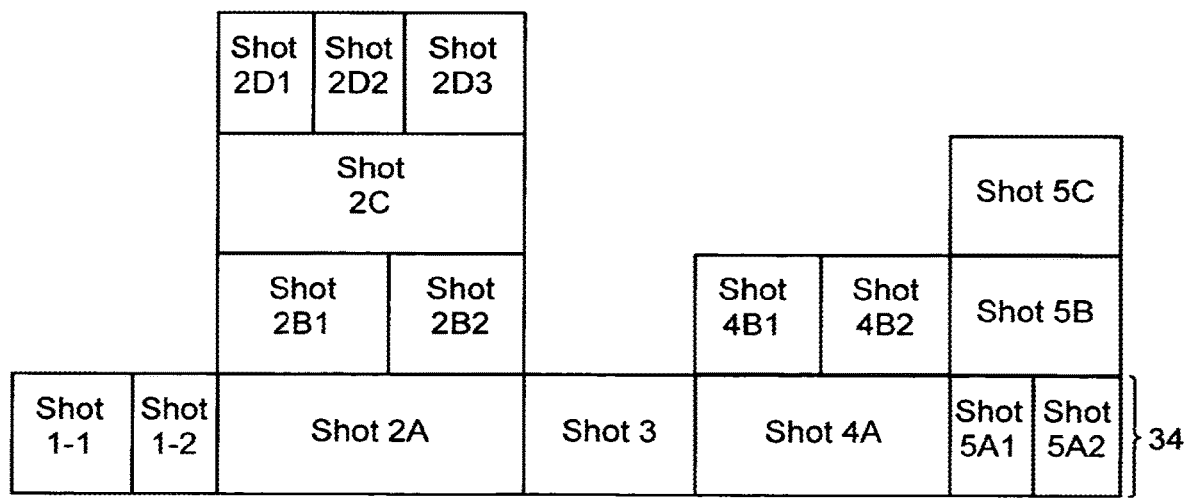
FIG. 4 shows an example video matrix with multiple shots per option.

In order to understand how this video-matrix can be applied to define any set of commercials, it is helpful to look at some more examples. First, consider an example shown in FIG. 4, that is similar to the previous example, yet allows for a slot to contain an arbitrary number of shots, as long as the length of the various options for a given slot is identical. In this example there is a default commercial 34 (Shot 1-1, Shot 1-2, Shot 2A, Shot 3, Shot 4A, Shot 5A1, Shot 5A2) as well as 23 alternative commercials.

Figure 5:
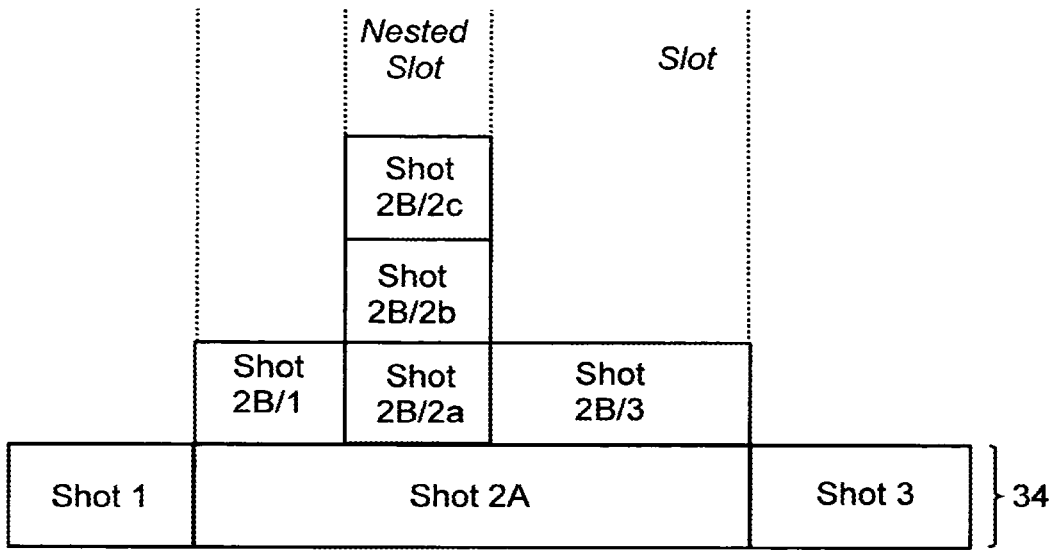
FIG. 5 shows an example nested video-matrix.

Another example as shown in FIG. 5 is where there is nesting of slots (in other words: a choice within another choice). In this example, the default commercial 34 consists of the sequence (Shot 1, Shot 2A, Shot 3). The alternative commercial has Shot 2A replaced, resulting in the sequence (Shot 1, Shot 2B/1, Shot 2B/2a, Shot 2B/3, Shot 3). However, since the second shot in the 2B-sequence is again a slot with more options, there are two more valid commercials in this video-matrix, namely (Shot 1, Shot 2B/1, Shot 2B/2b, Shot 2B/3, Shot 3) and (Shot 1, Shot 2B/1, Shot 2B/2c, Shot 2B/3, Shot 3). So the total number of commercials in this video-matrix is four (=1×(1+(1×3×1))×1).

Figure 6:
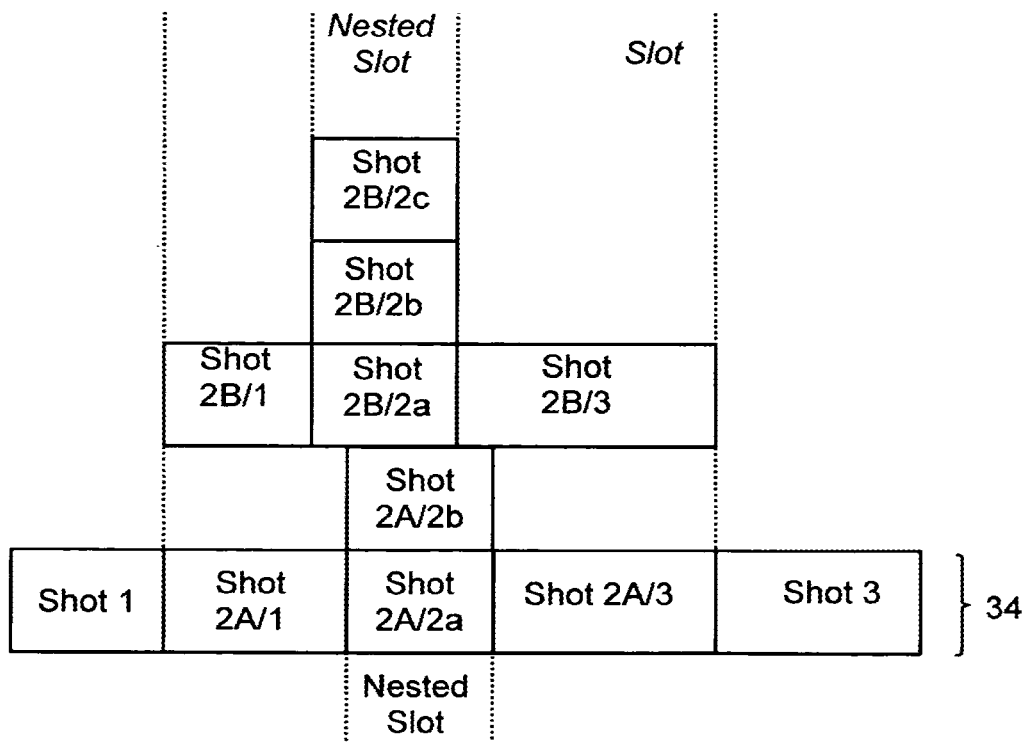
FIG. 6 shows an example double narrative nested matrix.

A slightly more complex example of nested slots is illustrated in FIG. 6. In this example the default commercial 34 is (Shot 1, Shot 2A/1, Shot 2A/2a, Shot 2A/3, Shot 3). There are two slots within that message: Shots 2A together represent a slot, yet within that also Shot 2A/2a represents a (nested) slot. The same is true for shots 2B and shot 2B/2a. Therefore, in addition to the default commercial 34, the following sequences represent valid commercials in the video-matrix: (Shot 1, Shot 2A/1, Shot 2A/2b, Shot 2A/3, Shot 3), (Shot 1, Shot 2B/1, Shot 2B/2a, Shot 2B/3, Shot 3), (Shot 1, Shot 2B/1, Shot 2B/2b, Shot 2B/3, Shot 3), (Shot 1, Shot 2B/1, Shot 2B/2c, Shot 2B/3, Shot 3). Total number of commercials in this video-matrix is five (=1×((1×2×1)+(1×3×1))×1).

A video-matrix may contain many sequences (permutations of shots and options), some of which may be invalid. In the present invention it is possible in a video-matrix, to specify which permutations are invalid. This effectively reduces the number of commercials within a video-matrix, as shown in the example presented in FIG. 7. This video-matrix would normally contain six (1×2×3×1) different commercials. But for this example, assume that for some reason the author of the video-matrix does not want the combination of Shot 2A with Shot 3B to occur in any commercial. The author would then put a limitation in the video-matrix that renders invalid any commercial that contains this combination of shots. The result would be that the video-matrix now "only" contains five (=(1×3×2×1)−1) valid commercials, namely (Shot 1, Shot 2A, Shot 3A, Shot 4), (Shot 1, Shot 2B, Shot 3A, Shot 4), (Shot 1, Shot 2B, Shot 3B, Shot 4), (Shot 1, Shot 2C, Shot 3A, Shot 4), (Shot 1, Shot 2C, Shot 3B, Shot 4).

By combining all these techniques and examples, and applying them to real sets of commercials, it is clear that any set of commercials that have common elements can be expressed as a video-matrix. Moreover, even in the "worst" case of a set of commercials that have no common elements at all, it is possible to combine the commercials in a video-matrix. One would simply create a "slot" that covers the full length of the commercial, and the various commercials would represent full and complete options within that slot, as is illustrated in FIG. 8. This video-matrix contains exactly 2 valid commercials, namely the default (Shot 1, Shot 2, Shot 3, Shot 4, Shot 5) and the alternative one (Shot 6, Shot 7, Shot 8, Shot 9).

Figure 9:
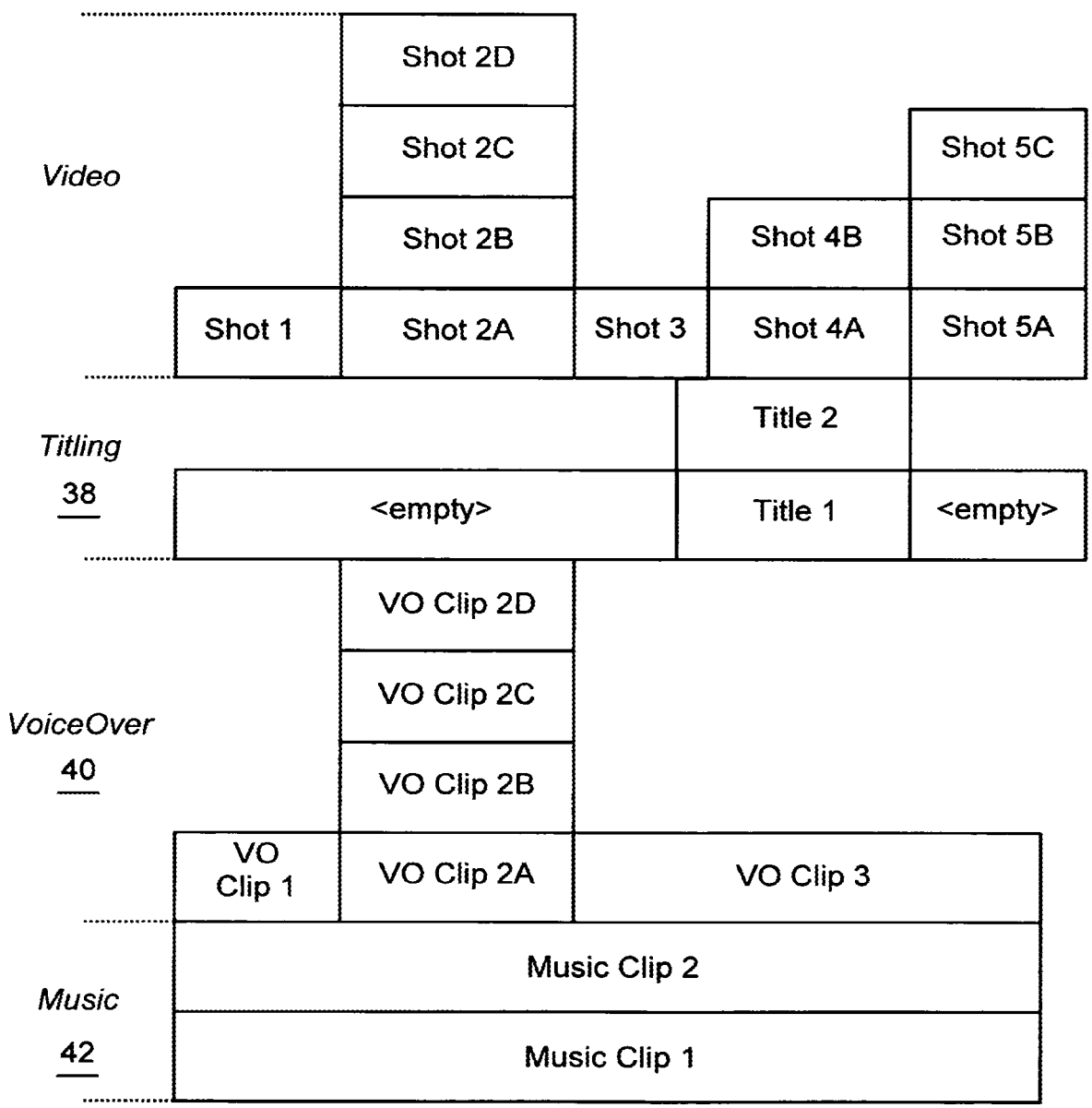
FIG. 9 shows an overall matrix according to the present invention.

The disclosure so far has only described the video part of TV commercials. The present invention is not limited to video, but also extends to audio and other multi-media elements. For this purpose, additional dedicated matrices for titling, voiceovers, and music are introduced. Conceptually these matrices all describe different "planes" or "views" of the template, where the resulting overall commercials are built by combining all these "planes" into discrete commercials. The four matrices can all have slots and options independent of each other. An example of an overall-matrix 36 is shown in FIG. 9. The titling-matrix 38 contains the various graphics and/or titles that are going to be part of the commercial. The voiceover-matrix 40 contains the voiceover clips, and the music-matrix 42 contains the background music clips. The four matrices are combined into an overall-matrix 36 that represents the final personalized commercial campaign template including video, audio, and graphics.

This overall matrix describes a set of TV commercials with twenty-four (=1×4×1×2×3) video messages, two titling messages, four (=1×4×1) voiceover messages, and two music messages. Theoretically the total number of different TV commercials contained within the overall-matrix is therefore three hundred and eighty-four (=24×2×4×2). However in reality there will typically be restrictions built into the matrix, for instance certain voiceover options can only be combined with certain video options, so that the real number of valid TV commercials in the matrix would typically be less than three hundred and eighty-four.

Note that more matrices may be added for specific multimedia elements if required. For example there could be a matrix for interactive application data that is part of a commercial, further there could be multiple video matrices for devices that combine multiple video sources, etc.

Figure 10:
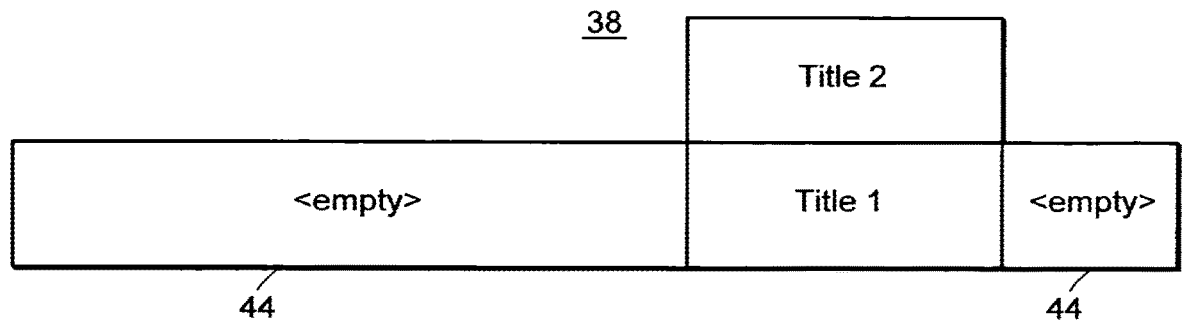
FIG. 10 shows a titling matrix according to the present invention.

An example of a titling matrix is shown in FIG. 10. As discussed in the previous section, titles and graphics can be expressed as media elements in a matrix, so that there can be variation in the titling and graphics of a matrix of TV commercials. This simple matrix represents a situation with no titling-overlay 44 in the beginning of the commercial, followed by a default title overlay "Title 1", with an alternative title overlay "Title 2". The end of the commercial, again carries no titling-overlay 44.

Figure 11:
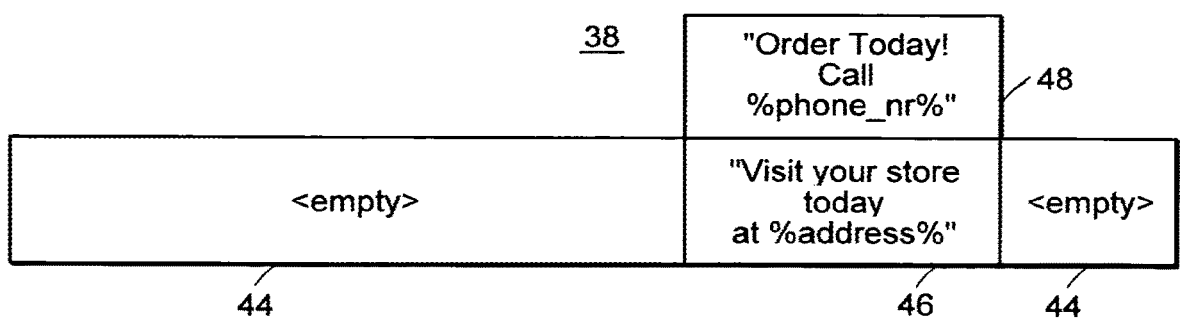
FIG. 11 show an example titling matrix with parameters.

In addition to this, the titling matrix 38 enables one to parameterize the title overlay by including references to values that will be computed later on (from database tables, or other sources of information). Consider the example in FIG. 11. This matrix represents a situation with no titling overlay 44 in the beginning of the commercial, followed by a default title overlay 46 "Visit your store today at %address%", where %address% is referring to a store address that is computed later on (:from a database or otherwise). The alternative title overlay 48 is "Order Today! Call %phone_nr%", where %phone_nr% refers to a phone number that is computed later on. If the computation of store addresses, resp. phone mm1bers; results in NR_ADDRESSES different store addresses, and NR_PHONE_NUMBERS different phone numbers, then it is clear that this titling matrix represents NR_ADDRESSES+NR_PHONE_NUMBERS different titling overlay sequences for the associated commercials.

The concept of a matrix, as defined in the previous sections, basically introduces a representation for personalized TV commercial campaign templates. For example, a matrix can represent a campaign, where the actual TV commercial that is shown to an individual (or group) is customized to, and specific for that individual (or group).

In order to facilitate this, the matrix concept is extended with the concept of a target. A target is an individual, or a group of individuals, that may view one of the TV messages in the matrix. The set of all targets represents the set of all potential viewers of TV commercials from the matrix. A target is defined in terms of segmentation parameters. Segmentation parameters may be demographic parameters (e.g. income level), environmental parameters (e.g. current temperature outside), contextual parameters (e.g. which TV channel is currently being watched), or any other parameters. Each segmentation parameter may have a set of values. The matrix allows segmentation-parameter values to be attached to slot-options. These associations can be simple (e.g. "slot option B1" is associated with "income=high") or may be combined in more complex expressions (e.g. "slot option B2" is associated with "income=low AND current_temperature>50"). Since any target can be represented as a set of values for the segmentation-parameters, this mechanism can be used to associate one or more targets with each TV commercial in the matrix.

It is important to note that this mechanism may work with any set of segmentation parameters (with finite, or even infinite values), and with any expression syntax for combining values (Boolean logic, fuzzy logic, rule-based systems, etc.).

Personalized TV commercials may be delivered over various distribution networks. Examples of distribution networks include: analog cable networks, digital cable networks with set top boxes with or without hard disks, digital satellite networks with set top boxes, internet streaming, Video-On-Demand-systems, distribution on hard media such as CD or DVD discs, etc.

Certain networks may impose certain restrictions on personalized TV messages. These restrictions can be fundamental (e.g. a certain network does not support a certain type of audio formats) or practical (e.g. a certain network operator wants to allocate only finite resources to a personalized TV campaign in terms of storage and/or bandwidth). This can easily be represented in the matrix as a set of delivery-related restrictions. These restrictions can be bandwidth related (e.g. the total number of different options for slots at a specific point in time not to exceed X), storage related (e.g. the total size of all media fragments in a matrix not to exceed Y), or other.

It is also important to point out that, since a matrix may be designed for different delivery networks, with different characteristics, a matrix may have different sets of restrictions associated with it, one per delivery network.

Figure 1:
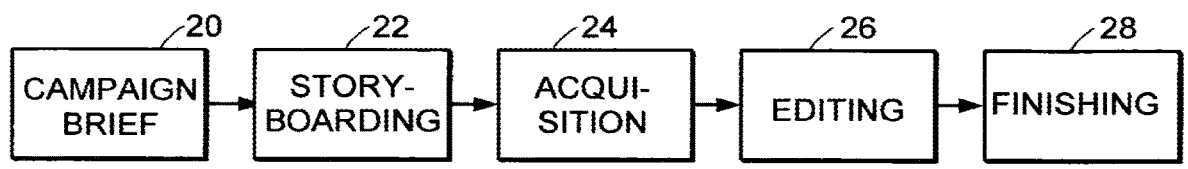
FIG. 1. shows the process of workflow for commercials in the prior art.
Figure 2:
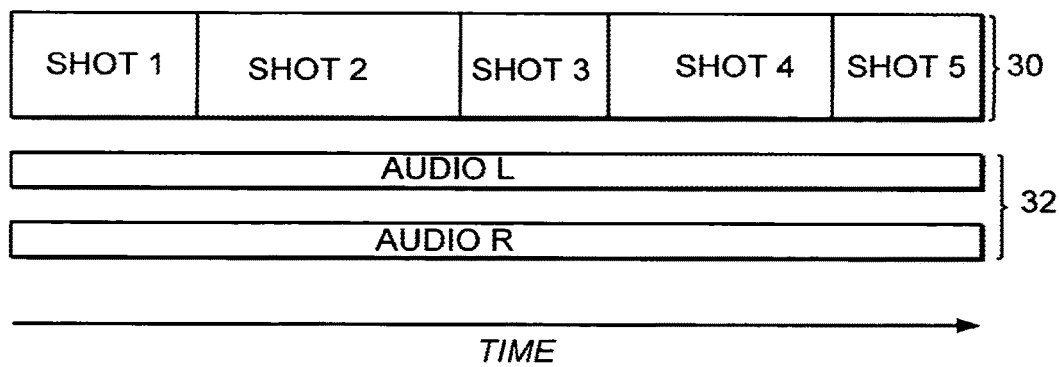
FIG. 2 displays the linear narrative result of the workflow process of FIG. 1.

Tools used in the present day for media creation and editing will benefit from the present invention. Presently, linear commercials are authored and finished based on the workflow as depicted in FIG. 1. This workflow is supported by a variety of tools, such as Non-Linear-Editors (NLEs), Audio Editors, etc. Matrix-based templates according to the present invention provide enhancements to this workflow and the tools that support it. The present day tools, by themselves, are not properly equipped to build and finish matrix-based templates. Descriptions of tools and illustrative embodiments that support matrix-based template building will now be disclosed. The tools are designed in such a way that they augment the present day production processes and tools (instead of replacing them). This makes their initial acceptance much easier. Alternative implementation strategies are discussed further below.

Figure 12:
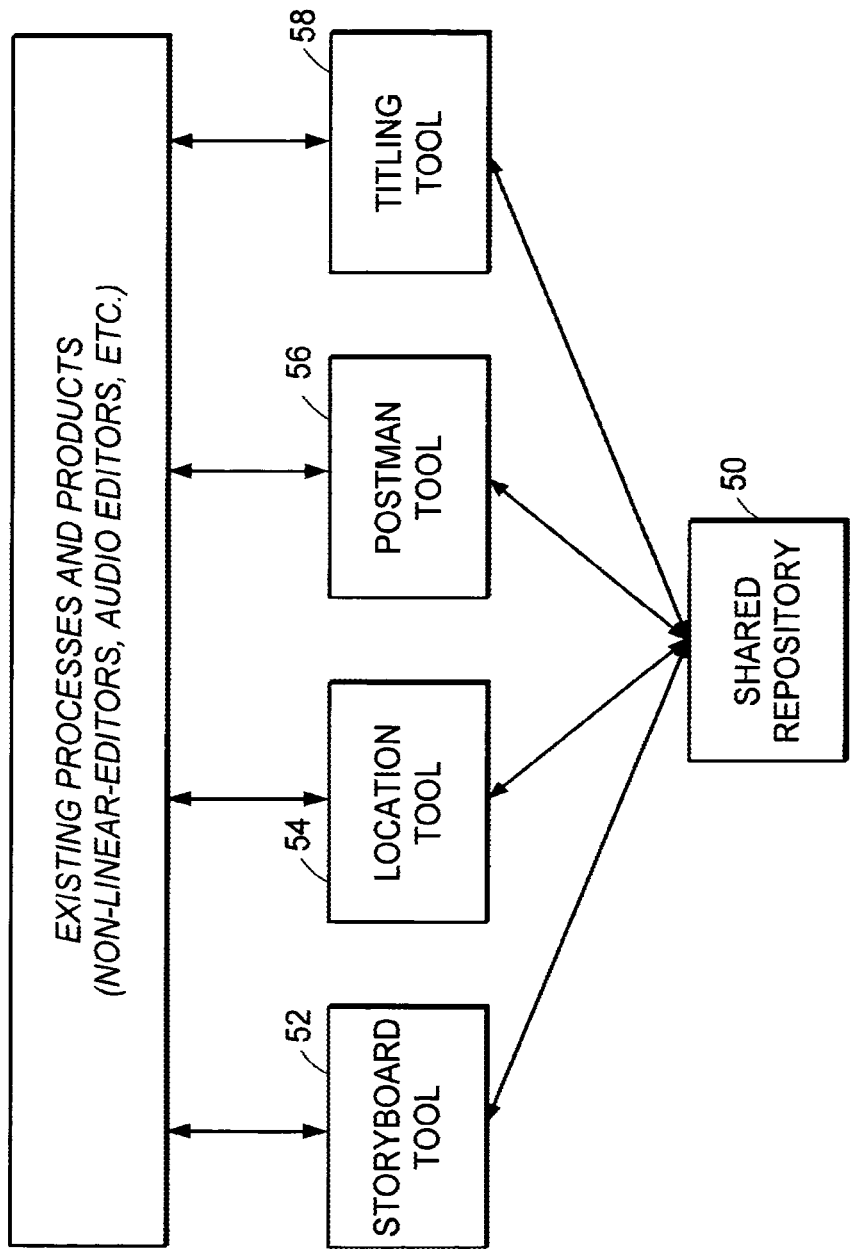
FIG. 12 provides an overview of a suite of authoring tools according to an illustrative embodiment of the present invention.
Figure 13:
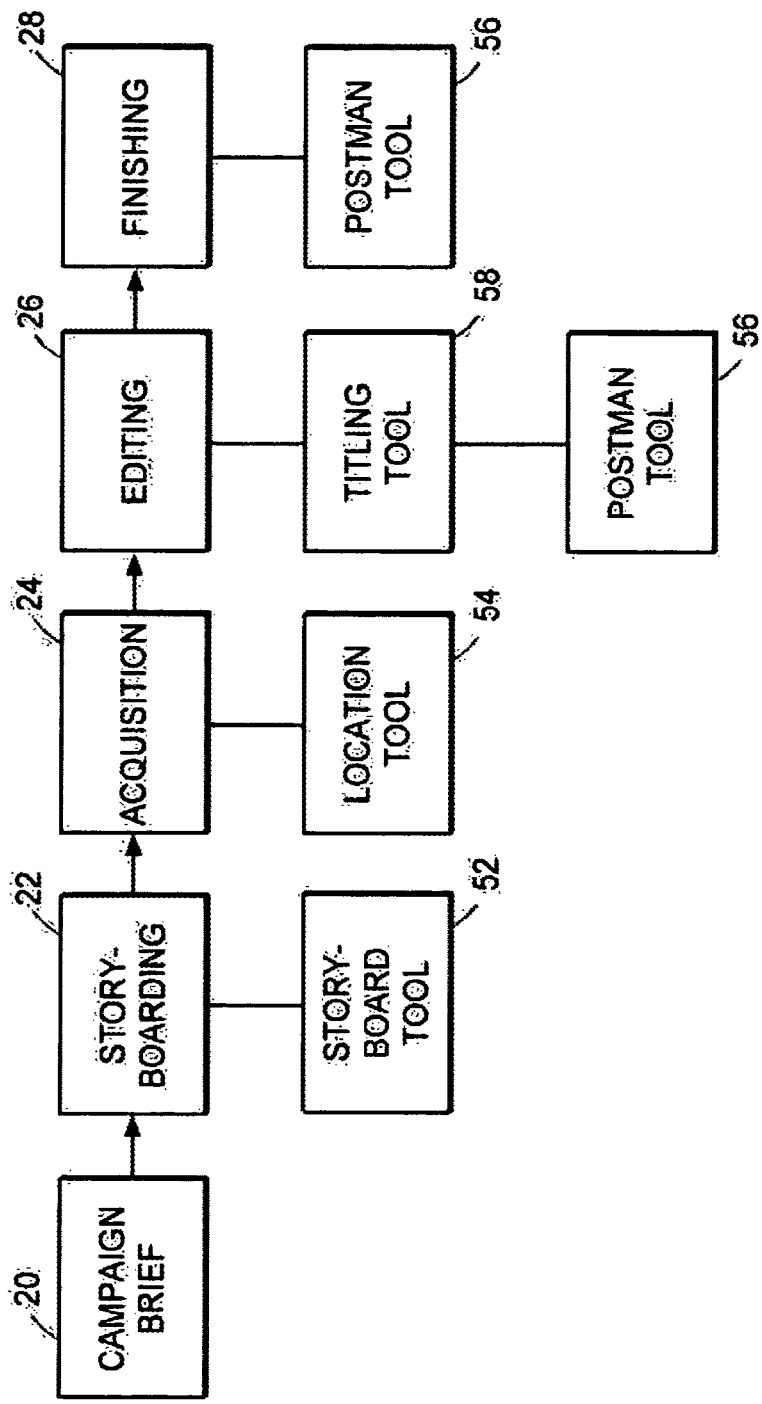
FIG. 13 provides a mapping of authoring tools on workflow as previously described in FIG. 1.
Figure 14A:
FIG. 14A, FIG. 14B, FIG. 14C and FIG. 14D show samples of simple networks according to the present invention.
Figure 14B:
Figure 14C:
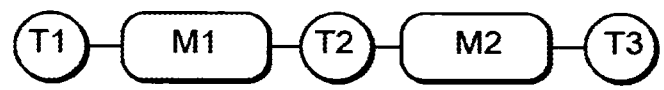
Figure 14D:
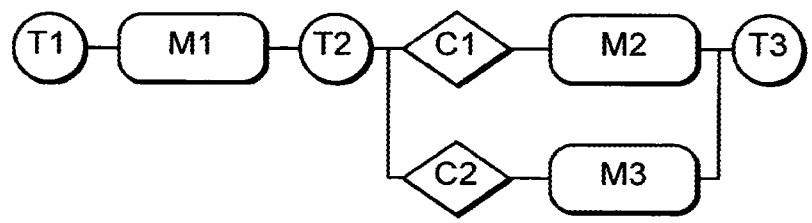

An illustrative embodiment of a high-level design of a tool set is illustrated in FIG. 12. The basic premise is to introduce a suite of tools that assist in the workflow in order to facilitate the authoring of matrix-based templates. The tools interface with the processes and products that are currently used in production and post-production. Each tool is specifically designed to assist in one (or two) phases of the workflow (as illustrated in FIG. 13). They share information through a common repository 50.

The fundamental goal of the tools is to build and maintain a data model that defines the relation between media, data, and different variants of the TV commercial (which is something the currently existing tools cannot do). This is done in an illustrative embodiment by maintaining a data model (called network or template) that links all media and all data together. This network is defined in early stages in the process, and is refined and finished in the final stages. A network is shared between all tools. A network consists of three basic building blocks (called elements or objects) that can be combined to represent any matrix-template:

Media Elements represent one or more pieces of media. This can be a video shot, a series of video shots, audio, titles, pictures, etc. A media element may also contains meta-data on the media elements it represents (for instance what actors appear in it, descriptive text, copyright information, etc.).

Conditions represent expressions that allow for certain parts of the network to be conditional upon audience data (such as demographics). The expressions can be logical expressions, fuzzy logic, or any other conditional expression language. The data can be demographics data, real-time data, or any other type of data that is either stored in data-bases, or is made available in another way. Conditions also have the concept of priority. So two conditions may both be true, but they may have different priority.

Time Nodes represent specific times in the network. Time Nodes can have relative time or absolute time. They typically represent the timing of a choice in the network.

A number of examples of networks are shown in FIGS. 14A-14D (rounded squares marked M represent media elements, circles marked T represent time nodes, and diamonds marked C represent conditions).

The first example (A) starts with a simple network that starts with a time node (T1), followed by a media element (M1), and ends with time node (T2).

The second example (B) shows a similar network, but now the media element is associated with condition (C1). If C1 is true, the effect of example B is identical to example A. If C1 is false the network is empty Gust has a begin time and end time). In the general case media elements (or sequences of media elements) have conditional associated with them, but in case that condition is always true, it may be left out. In other words, example A could be represented as example B with C1=always true).

The third example shows a start time node (T1), followed by media element (M1), followed by time node (T2), followed by media element (M2), ending with time node (T3). This represents a simple timed sequence of two media elements.

The final example (D) starts with time node (T1), followed by media element (M1), followed by time node (T2). After this, there are two possible media elements, M2 and M3, both followed by end time node (T3). Media element M2 is associated with condition (C1), and media element (M3) is associated with condition (C2). This network represents a timed conditional sequence of media elements as follows:

TABLE 1

| Evaluation of Conditions | Resulting Sequence |
| --- | --- |
| C1 = false AND C2 = false | M1 |
| C1 = true AND C2 = false | M1, followed by M2 |
| C1 = false AND C2 = true | M1, followed by M3 |
| C1 = true AND C2 = true AND priority(C1) > priority (C2) | M1, followed by M2 |
| C1 = true AND C2 = true AND priority(C2) > priority(C1) | M1, followed by M3 |

These examples illustrate the basic concepts of a network, and suggest how a network may be used to express more complex matrix-based templates.

A more formal definition of a network is as follows. Networks are built from the following 3 basic elements (which can be thought of as objects or object classes):

Media Elements represent media sequence(s). They basically contain references to the media in some form, as well as meta data on that media. There are different types of media elements, one for video media, titling media, audio media, narration media (more can be added if needed).

Conditions represent expressions that may refer to data in databases, or any other data. These expressions will render true or false, depending on the values of the underlying data, as well as a priority. The priority is used to select between multiple conditions that render true at the same point. The expressions may be in any expression language.

Time Nodes represent discrete points in the timeline of a commercial. There is a start time node, an end time node, and there can be any number of time nodes in between.

Elements in a network may be connected as follows:
A network always starts with at least one start time node.
A time node can be followed by another time node. This represents a situation where a certain time interval in the commercial is (still) empty.
A time node can be followed by a media element. This represents a situation where the media elements start at a specific time in the commercial.
A time node can be followed one or more conditions. This represents a situation where there is an element of choice at a certain specific time in the commercial. When executed, the condition that renders true and has the highest priority, prevails.
A time node can be followed by a media element as well as one or more conditions. This represents a situation where there is an element of choice between the default (media element) and other options (conditions). When executed, the condition that renders true and has the highest priority prevails. In case all conditions render false, the default prevails.
A condition is always followed by a media element. This represents the fact that the conditional expression is associated with that specific media sequence.
A media element is always followed by one time node. This represents the fact that a media sequence always ends a specific time.
Multiple media elements may be followed by the same time node. This represents an end of a slot.
A network always ends with at least one end time node.

A network can be stored in different ways. Since a network basically consists of a collection of elements and relations between these elements, it can be stored in a relational database, in a object-oriented database, in XML files, in proprietary formats, etc. The main thing is that there is a place to store networks, and to share them between the various tools that access and manipulate them. In the remainder of this chapter we will refer to this place as the Shared Repository.

In the illustrative embodiment, a network is a representation of a personalized commercial campaign template. It is built, manipulated, and finalized through a set of tools. Each tool has specific tasks in building or refining the network. Each tool will also enforce specific constraints and constructs, so that at the end of the process, the resulting network will represent a valid campaign template.

The StoryBoard Tool 52 essentially builds the network (create media elements, time nodes, and conditions, and connect them in a meaningful way). The resulting network will be complete, although the media elements may not yet have media associated with them (or temporary media), the conditions are in place (although the final underlying database functions may not be in place yet), and the time nodes are in place (although they may only indicate rough timing).

The User Interface of the Tool represents the network structure in an intuitive and user-friendly way. An implementation of the User Interface may combine three different windows:

The main network window provides a representation of the network. The network is divided in four different sub-networks (video, audio, titling, narration). The various media elements can be associated with (and shown as) scanned images, stills, or any other representations. The network can be shown completely, or sub-networks may be hidden (e.g. only look at video and narration, hide titling and audio). There is an option to select and browse single paths through the network. Time nodes are not shown explicitly, but are implicitly derived from timing of various media elements. Although this time is not going to be final (final timing is typically determined during post-production), they may be used as rough time indicators. The matrix can be shown in non-timed mode (e.g. each shot has same length) or in absolute time-mode (length of shots shown proportionally).

The data/selection window is essentially a representation of expressions and data within expressions. The window contains a representation of the various segmentation parameters that are available to the campaign designer (for instance "income=high" or "age=young"). These parameters represent condition objects. They can also be combined (for instance "income=high AND age=young") in which case a new condition object is created to represent the combined expression). The various parameters and expressions can be dragged and dropped to media elements in the main network window. This has the effect of creation a new condition and inserting it in the network before the media element.

The media window can be used to browse available media elements. These elements can be scanned images, still images, etc. They basically represent the media elements that are available for building a network. Any element can be dragged and dropped onto the main network window. This will have the effect of creating a new media element, inserting it at a certain place in the network (also creating one or two time nodes when needed).

Figure 15:
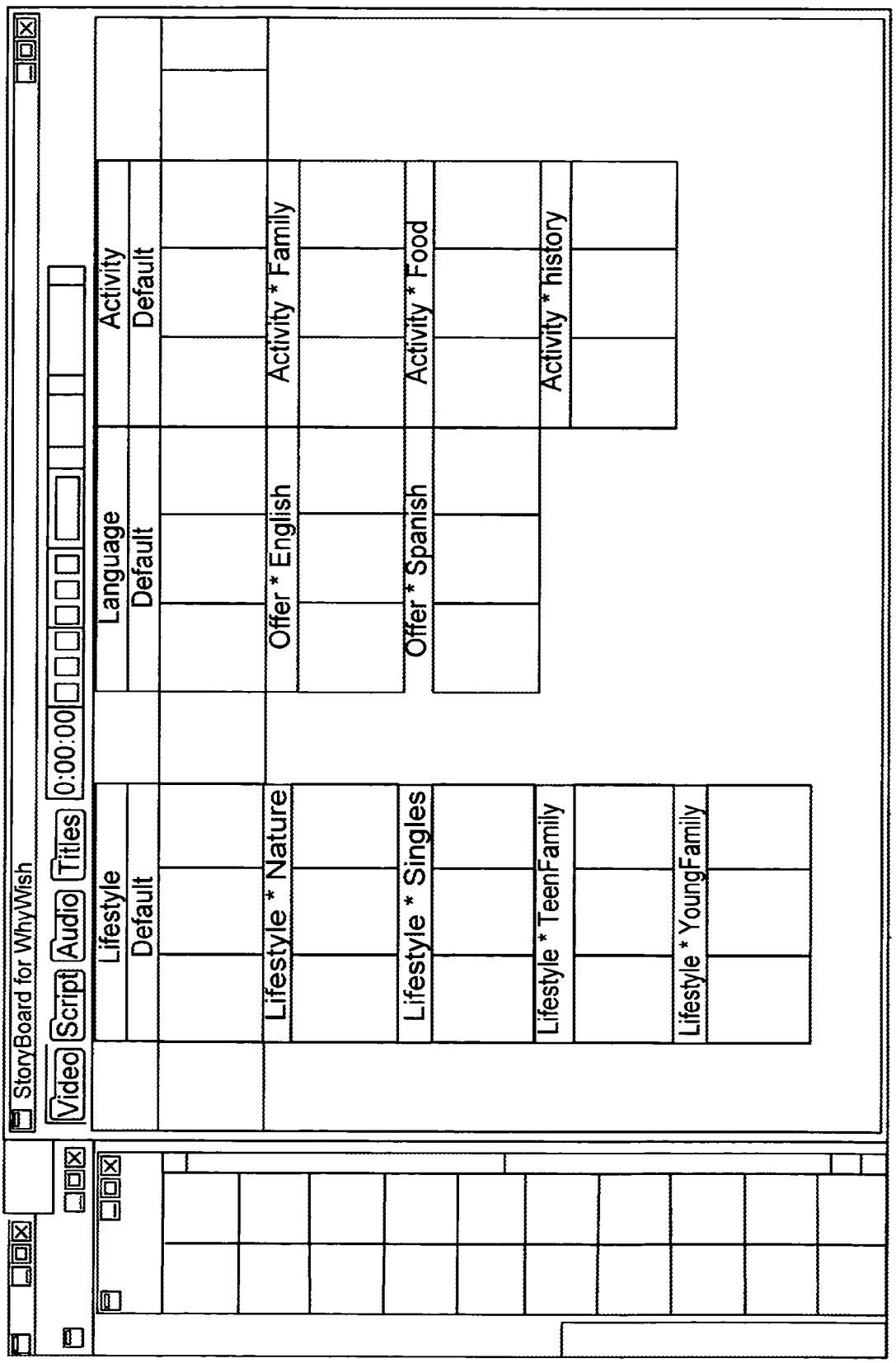
FIG. 15 shows a screen shot of a storyboard tool according to an illustrative embodiment.

A screen shot of a storyboard tool according to an illustrative embodiment is shown in FIG. 15. A main network window is shown on the fight side, and a set of stacked media windows is on the left side. A data/selection window is not shown in this example. The StoryBoard may be used to create a brand new network, yet can also be used to refine or modify an existing network. In reality it will probably be used in several sessions to go from initial concept to final network. The StoryBoard Tool 52 will ensure that, at all times ensure that the network is structurally correct (e.g. following the formal network specification rules as previously described).

In addition to this, the StoryBoard Tool 52 can also check against delivery constraints. Delivery constraints are specific limitations related to bandwidth or storage or formats that are imposed by specific delivery networks. Examples are: certain digital cable network may not support certain audio types, or a certain satellite network may have bandwidth limitations that restricts the number of simultaneous slot options, etc. The StoryBoard Tool 52 will check these constraints by inspecting the network data structure, and issuing appropriate warnings where necessary.

In an illustrative embodiment, a StoryBoard Tool 52 may also have the following features:
Printing features, including the ability to print high-quality, customized reports of the campaign template.
Animation features, including the ability to select a target (or set of segmentation parameter values) and play out an animated version of the associated commercial.
The ability to "pre-package" certain parts of the network (in terms of structure, or pre-packaged segmentation parameters, or any combination thereof), and be able to save these as templates (which can be used as starting points for building several other networks).
The ability to (automatically or manually) check the matrix against delivery constraints (including specific warnings about where delivery constraints are violated and how that could be fixed).
The ability to import segmentation data from other systems and tools in general, and from data analysis and data segmentation tools specifically.

An illustrative embodiment of a Location Tool 54 assists producer and production crew in acquiring material for a matrix-based commercial. The tool needs a valid network structure as input (typically built by the StoryBoard Tool 52). The tool will analyze the network, and extract all media elements from it, and present an "electronic checklist" of the media that needs to be filmed, recorded, computer generated, or otherwise created. This checklist is interactive, so that the production crew can "electronically check oft" the media that are acquired. As far as the network structure, the Location Tool 54 may only (optionally) update the existing media elements to refer to the newly acquired raw media. Typically the tool does NOT change the network in any other way.

An illustrative embodiment of a Titling Tool 58 assists creative staff and editors to design the titles that are used in the campaign. While the Storyboard Tool 52 and Postman Tool 56 define when titles appear in the messages, the Titling Tool 58 focuses on the actual screen layout, effects, precise timing, etc. It allows the appearance of the title to be designed, while the content of the title can later on be customized/changed according to the play-out rules and data.

The Titling Tool 58 typically needs a valid network structure as input (typically built by the StoryBoard Tool 52). The tool will only access the titling sub-network. It analyzes the titling sub-network, and allow creative designers (on a per titling media element basis) to design the exact screen-layout of the element, precise timing, add effects, etc. As a result, the titling sub-network will be updated as follows:
Time nodes within the titling sub-network may be updated (to reflect changes in precise timing of the individual titles).
The titling media elements will be updated to refer to the newly designed titling formats, as well as additional meta data on effects etc.

Typically the Titling Tool 58 does not change the network in any other way.

An illustrative embodiment of a PostMan Tool 56 is used to do the final updates of the network structure and make it ready for further automatic processing and delivery. The Postman Tool 56 plays a central role during post-production (editing and finishing). It interfaces with all other products that are used in production and post-production. The user interface of the tool represents the network structure in an intuitive and user-friendly way. An implementation of the User Interface may combine three different windows:
The main network window as a representation of the network. It looks very similar to the main network window in the StoryBoard Tool. The network is divided in 4 different sub-networks (video, audio, titling, narration). The various media elements can be associated with (and shown as) scanned images, stills, or any other representations. The network can be shown completely, or sub-networks may be hidden (e.g. only look at video and narration, hide titling and audio). There is an option to select and browse single paths through the network. Time nodes are not shown explicitly, but are implicitly derived from timing of various media elements. The matrix can be shown in relative time-mode (e.g. each shot has same length) or in absolute time-mode (length of shots shown proportionally). All media elements in the main network window have a status label. The status label indicates whether or not the specific media sequence is finalized and valid. So for instance if the media sequence for a certain media element is still un-edited it will be marked with a red label, if the media sequence is edited and finished and final it will be marked with a green label. See also the PostMan Tool algorithm description below.

The selection window is essentially a representation of the various conditions and "paths" through the network. It is used to select certain parts of the network for production and post-production. The list will typically contain a "default" path, and all alternative paths. There is color-coding in the list to indicate paths that are finished, are still to be done, or are in conflict.

The media window can be used to browse available media elements. These elements can be scanned images, still images, etc. that can be associated with the media elements in the network. These images are for display only, and will not affect the final media.

Figure 16:
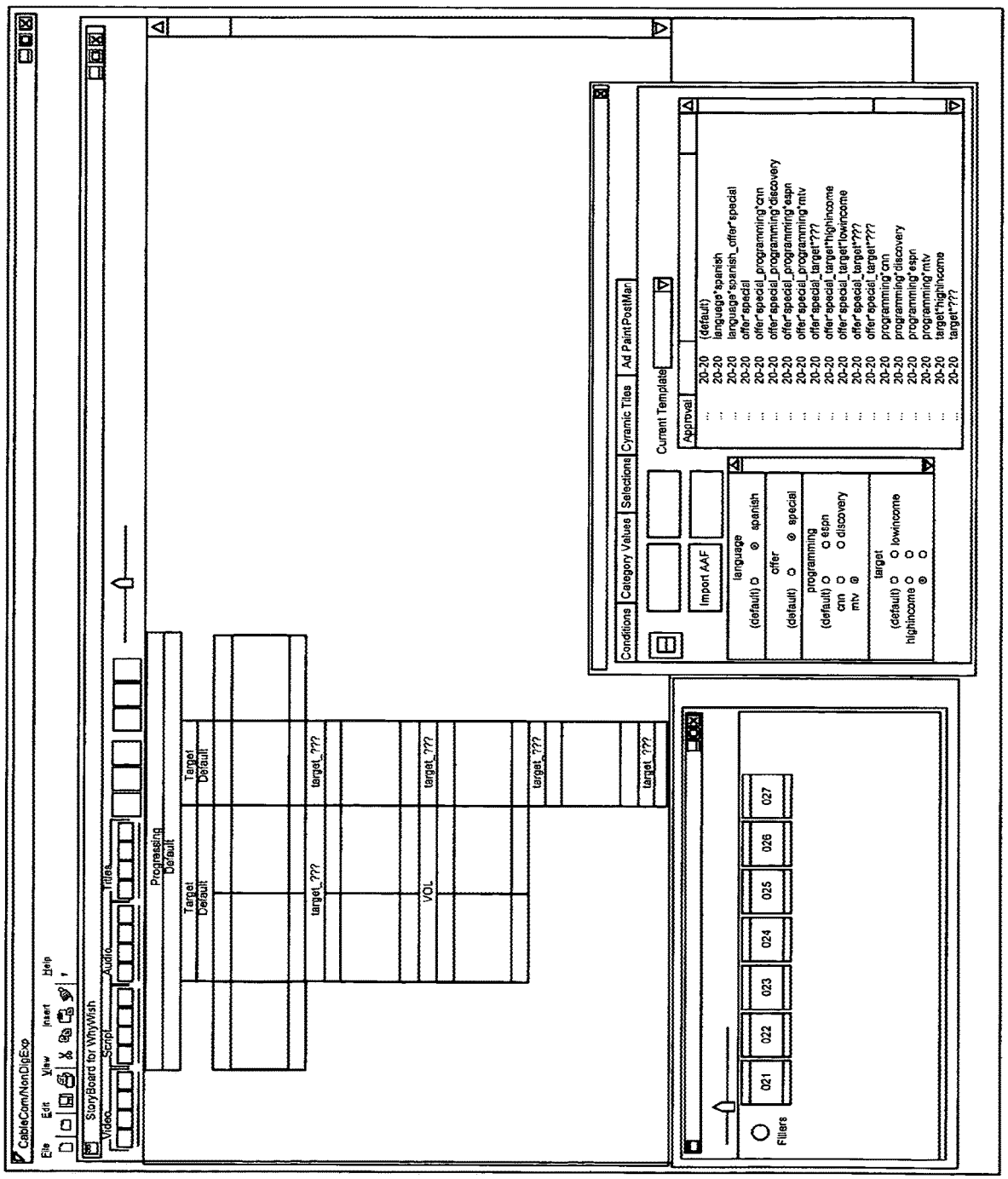
FIG. 16 shows a postman tool screen shot according to an illustrative embodiment.

An example screenshot of the PostMan Tool is shown in FIG. 16. It shows the main network window at the top, the selection window at the bottom right, and a media window at the bottom left. The PostMan Tool works from an existing, valid network structure, which it manipulates as follows:

Time nodes within the titling sub-network may be updated (to reflect changes in precise timing of media elements).

The media elements will be updated to refer to the final media, as well as additional data on effects etc.

Typically the tool does not change the network in any other way. The tools will produce the final network structure that is ready for further processing and delivery.

In an illustrative embodiment, the basic algorithm of the PostMan Tool is:
1. Mark all media elements in the network as invalid
2. Select next (partly) invalid media sequence from the network
3. Interact with post-production tools to produce a finished, post-produced version of that media sequence.
4. Check the finished media sequence for consistency with the network.
5. If inconsistent: trigger user, and present with options for repairing the inconsistency
6. If consistent: update the network structure to reflect the newly finished media sequence
7. If there is at least one invalid media element in the network: go to step 2.

Explanation:
1. The initial step is to render all media elements as invalid (meaning: not finalized). The status of a media element is kept in the network structure. The PostMan Tool will mark all media elements (in its main network window) with a status label reflecting its status, which can be either valid (green label) or invalid (red label).
2. During this step a next media sequence will be selected from the network. A media sequence is a complete set of media elements, and can either be video, audio, narration, titling, or any combination thereof. A sequence can consist of any combination of valid and invalid elements. The sequence can be hand selected by the operator of the tool, yet the tool will suggest the most optimal next sequence. The initial suggestion will be the default commercial. After that the sequence with the biggest number of invalid media elements will be suggested.
3. During this step a media sequence will be transferred to the appropriate post-production tool, where it will be produced and/or finished. An example is a sequence of video, audio, narration, and titles that will be transferred into a Non Linear Editor (NLE) for editing. The transfer can be through any interface that allows for the Non Linear Editor to be "loaded" with a media sequence to be edited. It is important that all elements in the media sequence are labeled with unique identifiers (by the PostMan Tool), and that these identifiers are kept during the editing process, and return with the media sequence when returning from the NLE to the PostMan Tool. One possible implementation of the communication interface between PostMan Tool and post-production tools is AAF (Advanced Authoring Format), which provides a standard protocol for transferring media structures.
4. Once the finished, post-produced media sequence is returned from the post-production tool to the PostMan Tool, the latter will check the consistency between the sequence and the network structure (it originated from). This check is by done by taking the unique identifiers of the media elements, and using them to "find back" the original media sequence in the network, and then comparing the two for consistency.
5. The consistency check may reveal one or more of the following problems:
a. Media elements may have wrong identifiers, or they are out of order. This error will be presented to the user, and unless the user re-arranges and/or modifies the identifiers, this is a non-correctable problem.
b. Media Elements have no identifier. This is a correctable problem, since the PostMan Tool will simply "add" these elements to the closed possible element that does have a known identifier.
c. The timing of the new sequence is different from the network, and is incompatible with timing of already validated media elements (e.g. different options for the same slot now have different lengths). This will be flagged to the user, who will have to choose which timing is valid.
6. In case of a non-conflicting situation, the network structure will be updated to include the newly finished media sequence. This may include: changing time nodes, and updating media elements to refer to the final media, and adding metadata.
7. Repeat these steps until all media elements in the network are valid at the same point in time. In this case the network is ready for further processing and delivery.

The tools as described in the previous paragraphs are just one possible implementation of the present invention for a system for authoring (matrix-based) personalized messages. Alternative implementations are possible. There are at least two different approaches to alternative implementations:
1. Leaving the current workflow and tools intact, yet augment them with a separate layer of authoring tools (just like the implementation as previously described), yet with a different implementation of the layer of authoring tools. Different tools implementations include: combine multiple tools in one tool, or break-up the tools functionality over more (or different) tools. It could also mean that certain tool functions are more intimately "added" to the existing post-production products (for instance through plug-ins in Non Linear Editing systems).

2. Creating a completely new implementation, where current post-production workflows and tools are replaced with new workflows and tools that combine the original functions with the functions of matrix-based messages. An example of this is to create a new Non Linear Editing system that features editing matrix-based messages. These two approaches can also be mixed.

Although the invention has been shown and described with respect to illustrative embodiments thereof, various other changes, omissions and additions in the form and detail thereof may be made therein without departing from the spirit and scope of the invention.

What is claimed is:

1. An apparatus comprising:
    one or more processors; and
    memory storing instructions that, when executed by the one or more processors, cause the apparatus to:
        receive information indicating, for one or more media slots, a bandwidth constraint;
        receive one or more media segments that are configured to be inserted into the one or more media slots;
        receive a model indicative of how to generate at least one advertisement for a target audience, using the one or more media segments, that complies with the bandwidth constraint for the one or more media slots, wherein the model comprises:
            one or more conditions associated with one or more sequences of the one or more media segments, wherein the one or more conditions indicate which media segment of the one or more media segments to select based on demographic data associated with the target audience and based on a priority associated with each condition of the one or more conditions, wherein the one or more sequences indicate which permutations of the one or more media segments are invalid, and
            metadata describing the one or more media segments; and
        based on the information, the demographic data, and each priority, generate the at least one advertisement using the one or more media segments and the one or more media slots to cause display of the at least one advertisement.

2. The apparatus of claim 1, wherein the one or more media segments are interchangeable with each other.

3. The apparatus of claim 1, wherein the generated at least one advertisement targets the targeted audience.

4. The apparatus of claim 1, wherein the one or more media segments comprise audio or video content.

5. The apparatus of claim 1, wherein a subset of the one or more media segments are usable to generate a default generic individual advertisement.

6. The apparatus of claim 1, wherein the one or more media segments comprise alternative segments of different lengths.

7. The apparatus of claim 1, wherein the metadata describing the one or more media segments indicate at least one of: an actor appearing in the one or more media segments, descriptive text for the one or more media segments, or copyright information for the one or more media segments.

8. The apparatus of claim 1, wherein the one or more conditions comprise one or more expressions that, when executed and based on the demographic data and based on a priority associated with an executed condition of the one or more conditions, cause a selection of a media segment of the one or more media segments.

9. The apparatus of claim 1, wherein the priority, associated with each condition of the one or more conditions, indicates which media segment of the one or more media segments to select when one or more executed conditions are true.

10. A system comprising:
    a first computing device configured to:
        receive information indicating, for one or more media slots, a bandwidth constraint,
        receive one or more media segments that are configured to be inserted into the one or more media slots,
        receive a model indicative of how to generate at least one advertisement for a target audience, using the one or more media segments, that complies with the bandwidth constraint for the one or more media slots, wherein the model comprises:
            one or more conditions associated with one or more sequences of the one or more media segments, wherein the one or more conditions indicate which media segment of the one or more media segments to select based on demographic data associated with the target audience and based on a priority associated with each condition of the one or more conditions, wherein the one or more sequences indicate which permutations of the one or more media segments are invalid, and
            metadata describing the one or more media segments, and
        based on the information, the demographic data, and each priority, generate the at least one advertisement using the one or more media segments and the one or more media slots to cause display of the at least one advertisement; and
    a second computing device configured to cause display of the at least one advertisement.

11. The system of claim 10, wherein the one or more media segments are interchangeable with each other.

12. The system of claim 10, wherein the generated at least one advertisement targets the targeted audience.

13. The system of claim 10, wherein the one or more media segments comprise audio or video content.

14. The system of claim 10, wherein a subset of the plurality of one or more media segments are usable to generate a default generic individual advertisement.

15. The system of claim 10, wherein the one or more media segments comprise alternative segments of different lengths.

16. The system of claim 10, wherein the one or more conditions comprise one or more expressions that, when executed and based on the demographic data and based on a priority associated with an executed condition of the one or more conditions, cause a selection of a media segment of the one or more media segments.

17. The system of claim 10, wherein the priority, associated with each condition of the one or more conditions, indicates which media segment of the one or more media segments to select when one or more executed conditions are true.

18. A method comprising:
    receiving information indicating, for one or more media slots, a bandwidth constraint;
    receiving one or more media segments that are configured to be inserted into the one or more media slots;

receiving a model indicative of how to generate at least one advertisement for a target audience, using the one or more media segments, that complies with the bandwidth constraint for the one or more media slots, wherein the model comprises:
- one or more conditions associated with one or more sequences of the one or more media segments, wherein the one or more conditions indicate which media segment of the one or more media segments to select based on demographic data associated with the target audience and based on a priority associated with each condition of the one or more conditions, wherein the one or more sequences indicate which permutations of the one or more media segments are invalid, and
- metadata describing the one or more media segments; and based on the information, the demographic data, and each priority, generate the at least one advertisement using the one or more media segments and the one or more media slots to cause display of the at least one advertisement.

19. The method of claim 18, wherein the one or more media segments are interchangeable with each other.

20. The method of claim 18, wherein the generated at least one advertisement targets the targeted audience.

21. The method of claim 18, wherein the one or more media segments comprise audio or video content.

22. The method of claim 18, wherein a subset of the one or more media segments are usable to generate a default generic individual advertisement.

23. The method of claim 18, wherein the one or more media segments comprise alternative segments of different lengths.

24. The method of claim 18, wherein the metadata describing the one or more media segments indicate at least one of: an actor appearing in the one or more media segments, descriptive text for the one or more media segments, or copyright information for the one or more media segments.

25. The method of claim 18, wherein the one or more conditions comprise one or more expressions that, when executed and based on the demographic data and based on a priority associated with an executed condition of the one or more conditions, cause a selection of a media segment of the one or more media segments.

26. The method of claim 18, wherein the priority, associated with each condition of the one or more conditions, indicates which media segment of the one or more media segments to select when one or more executed conditions are true.

* * * * *